(12) United States Patent
Shackleford et al.

(10) Patent No.: US 6,985,918 B2
(45) Date of Patent: Jan. 10, 2006

(54) RANDOM NUMBER GENERATORS IMPLEMENTED WITH CELLULAR ARRAY

(75) Inventors: J. Barry Shackleford, Portola Valley, CA (US); Motoo Tanaka, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 603 days.

(21) Appl. No.: 09/977,986

(22) Filed: Oct. 17, 2001

(65) Prior Publication Data

US 2003/0078951 A1    Apr. 24, 2003

(51) Int. Cl.
 *G06F 7/02*    (2006.01)
(52) U.S. Cl. ...................................... 708/250
(58) Field of Classification Search ............... 708/250, 708/252, 253, 256
 See application file for complete search history.

(56) References Cited

U.S. PATENT DOCUMENTS

| | | | | |
|---|---|---|---|---|
| 4,691,291 A | * | 9/1987 | Wolfram | 708/250 |
| 4,860,236 A | * | 8/1989 | McLeod et al. | 708/250 |
| 5,043,988 A | * | 8/1991 | Brglez et al. | 708/252 |
| 6,272,653 B1 | * | 8/2001 | Amstutz | 714/724 |
| 6,429,795 B1 | * | 8/2002 | Amstutz | 341/102 |
| 6,708,192 B2 | * | 3/2004 | Rajski et al. | 708/252 |
| 2002/0154769 A1 | * | 10/2002 | Petersen et al. | 380/42 |

* cited by examiner

Primary Examiner—Tan V. Mai

(57) ABSTRACT

A system and a method to generate cellular automata based random number generators (CA-based RNGs) are presented A CA-based RNG is where an output of each cell of the CA at time t is dependent on inputs from any cells of the CA (including perhaps itself) at time t−1. The connections (or inputs) are selected to produce high entropy such that the RNG passes a standard suite of random number of tests, such as the DIEHARD suite. The RNGs may be implemented with field programmable gate arrays.

23 Claims, 7 Drawing Sheets

RANDOM NUMBER GENERATORS IMPLEMENTED WITH CELLULAR ARRAY

RELATED APPLICATIONS

The following applications of the common assignee, which are hereby incorporated by reference, may contain some common disclosure and may relate to the present invention:

U.S. patent application Ser. No. 09/977,978, entitled "SOFTWARE IMPLEMENTATION OF CELLULAR AUTOMATA BASED RANDOM NUMBER GENERATORS"; and U.S. patent application Ser. No. 09/977,985, entitled "TRUTH TABLE CANDIDATE REDUCTION METHOD FOR CELLULAR AUTOMATA BASED RANDOM NUMBER GENERATORS"

FIELD OF THE INVENTION

This invention relates generally to random number generation. More specifically, this invention relates to systems and methods to generate cellular automata based number generators (CA-based RNGs).

BACKGROUND OF THE INVENTION

Since the inception of computers, random numbers have played important roles in areas such as Monte Carlo simulations, probabilistic computing methods (simulated annealing, genetic algorithms, neural networks, and the like), computer-based gaming, and very large scale integration (VLSI) chip-testing. The bulk of the investigation into random (more properly, pseudo-random) number generation methods has been centered around arithmetic algorithms. This is because the prevalent computing medium has been the general purpose, arithmetic computer. Digital hardware designers have long relied on feedback shift registers to generate random numbers.

With the advent of VLSI design, built-in self-tests have become advantageous. In this design, the bulk of the chip testing system is incorporated on the chip itself. Linear feedback shift registers were used initially to implement the random number generation portion of the built-in self-test.

In 1986, Wolfram (S. Wolfram, "Random sequence generation by cellular automata," *Advances in Applied Mathematics*, vol. 7, pp. 123–169, June 1986) described a random sequence generation by a simple one-dimensional (1-d) cellular automata with a neighborhood size of three. The work focused on the properties of a particular CA-based RNG identified as "CA30," so named due to the decimal value of its truth table. Statistical tests indicated that the CA30 was a superior random number generator to the ones based on linear feedback shift registers. Wolfram suggested that efficient hardware implementation of the CA30 should be possible.

Hortensius et al. (P. D. Hortensius, R. D. McLeod, and H. C. Card, "Parallel number generation for VLSI systems using cellular automata," IEEE Transactions on Computers, vol. 38, no. 10, pp. 1466–1473, October 1989) described the use of CA30 as a random number generator in an Ising computer. They also described using combinations of CAs (CA90 and CA150), which generated even better random numbers than the CA30. They further indicated that time and site spacing may improve statistical quality of random numbers generated by the CA. Time spacing is where the RNG is advanced more than one step between random number samples and site spacing is where not every bit value generated is used.

In the above conventional methods, no systematic way of fabricating a high quality CA-based RNGs exists.

SUMMARY OF THE INVENTION

In one respect, an embodiment of a method of implementing a cellular automata based random number generator (CA-based RNG) may include determining an interconnection topology. The interconnection topology may be explicitly dictated or may be generated based on inputs such as the number of neighborhood connections, length of the random number generator, and the like. The method may also include screening a CA-based RNG candidate based on the interconnection topology. Through the screening process, the candidate RNG may be kept for further testing or rejected because it is unlikely to pass the subsequent testing. The method may further include subjecting the CA-based RNG candidate through a suite of tests in response to the CA-based RNG passing the screening step.

In another respect, an embodiment of a CA-based RNG implementing-module may include an interconnection topology-determining-module determining an interconnection topology. The interconnection topology-determining-module may receive inputs and generate one or more topologies based on the inputs. The CA-based RNG implementing-module may also include a screening-module screening a CA-based RNG candidate for the interconnection topology. Through screening, the screening-module may reject candidate RNGs that are unlikely to pass the suite of random number tests. The CA-based RNG implementing-module may further include a testing-module subjecting the CA-based RNG candidate through a suite of tests in response to the CA-based RNG passing through the screening-module.

BRIEF DESCRIPTION OF THE DRAWINGS

Features of the present invention will become apparent to those skilled in the art from the following description with reference to the drawings, in which.

DETAILED DESCRIPTION

For simplicity and illustrative purposes, the principles of the present invention are described by referring mainly to exemplary embodiments thereof. However, one of ordinary skill in the art would readily recognize that the same principles are equally applicable to many situations in which random numbers generators are determined.

I. Cellular Automata

Cellular automata (CA) may be thought of as a dynamic system discrete in both time and space. CA may be implemented as an array of cells with homogeneous functionality constrained to a regular lattice of some dimension. For example, in one-dimension, the lattice could be a string (open-ended) or a ring (close-ended), or in two-dimensions, the lattice could be a plane (open-ended) or a toroid (close-ended). Open-ended CAs have boundaries that are fixed and close-ended CAs have boundaries that are periodic.

Each cell in the CA has a state that is updated as a function of its neighbor connections at each time step. In other words, the state of a CA at time t depends on the states of the connected neighbors at time t−1. For a binary CA cell with a neighborhood size of N, there are $2^{2^N}$ possible functions. Table 1 illustrates the numbers involved. As Table 1 shows, the universe of possible functions increases extremely rapidly as the number of neighbors N grows.

TABLE 1

| Neighborhood size N | # of Possible Functions |
| --- | --- |
| 1 | 4 |
| 2 | 16 |
| 3 | 256 |
| 4 | 65,536 |
| 5 | 4,294,967,296 |
| 6 | $1.84 \times 10^{19}$ |
| 7 | $3.4 \times 10^{38}$ |

Figure 1A:
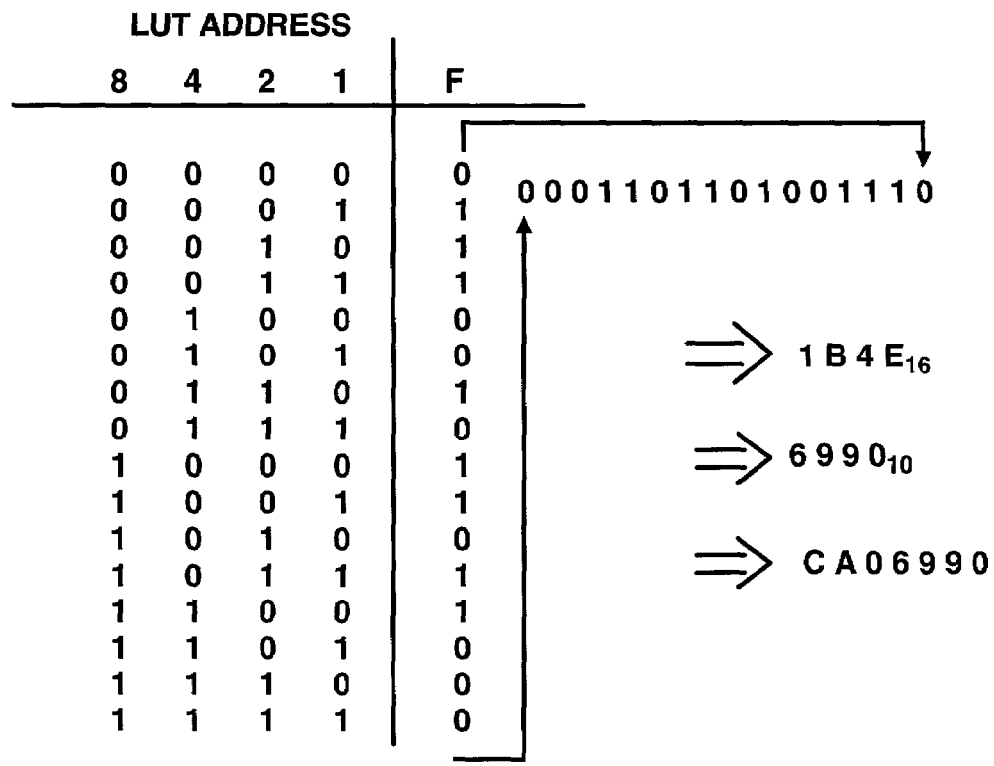
FIG. 1A illustrates an exemplary truth table for a four-input cellular automata cell and the naming notation for the cellular automata.
Figure 1B:
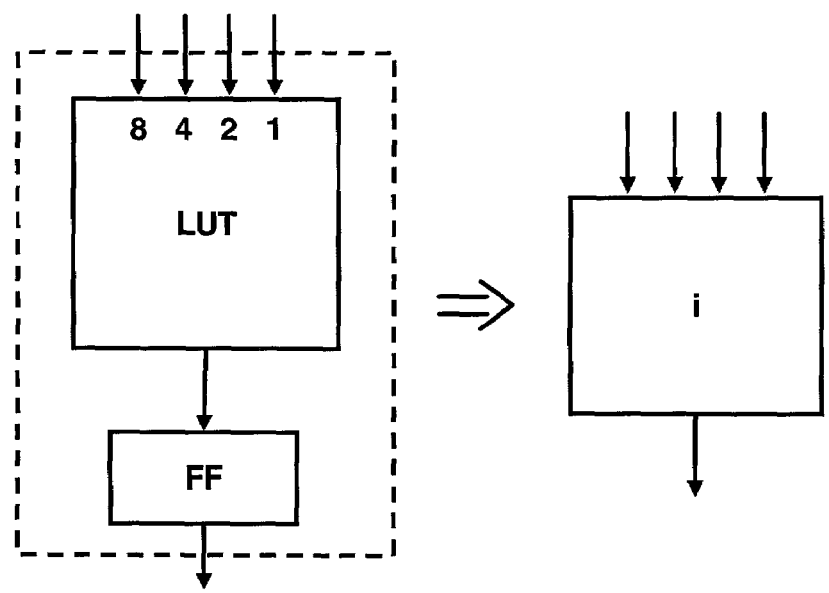
FIG. 1B illustrates an exemplary implementation of a cell of a cellular automata.

A function of a CA cell may be represented as a truth table. FIG. 1A shows an exemplary truth table for a four-input CA cell. FIG. 1B shows an exemplary implementation of a cell of the CA. As shown, the cell i implicitly includes a one-bit register. In this instance, there are 16 possible conditions to which a cell may respond (the neighborhood size N is 4 corresponding to the number of inputs). The number of unique responses is therefore $2^{16}$ or 65,536 (see also Table 1). In other words, there can be 65,536 unique four-input machines for a given interconnection topology.

Referring back to FIG. 1A, a notation is provided to identify the CA implementing the above function. In essence, the output of the truth table is used as the identification in conjunction with the interconnection notation. As shown, the output of the truth table is converted to a number (from binary to base 16 to decimal). The CA represented by the truth table in FIG. 1A is denoted to be CA06990.

Figure 1C:
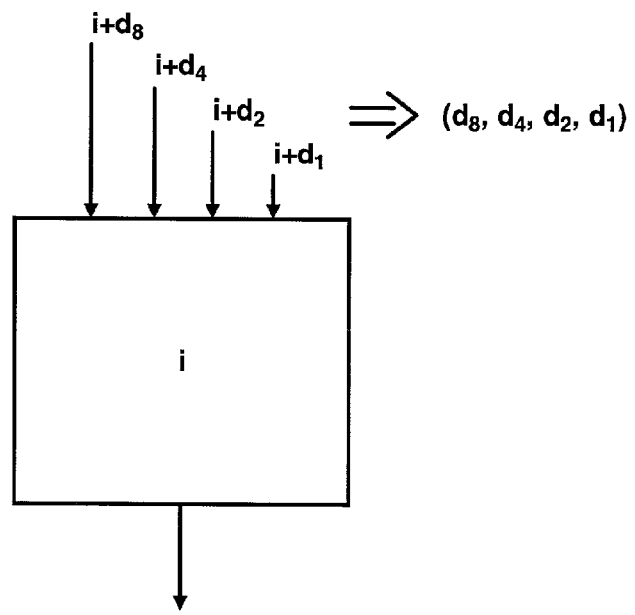
FIG. 1C illustrates an exemplary notation, a relative displacement notation, which provides a connection information of a CA cell.

As indicated before, a CA may be made of multiple cells, and the inputs of one cell may connected to the output of other cells. There may even be a feedback contact meaning that one of the inputs of the cell is connected the output of the cell itself. Thus, to uniquely identify a CA, the interconnection topology information should also be provided in addition to it's truth table representation. FIG. 1C illustrates an exemplary notation, relative displacement notation, which indicates the interconnection topology information of cell i, i.e., how far away the connecting cells are relative to a given four-input cell i.

With references to FIGS. 2A–2C, the effect of periodic boundary conditions on connections for one-, two-, and three-dimensional CA networks will be described below. In all three examples, 64-cell automata are illustrated. With 64 cells, the cells may be arranged as 64-cell long one-dimensional CA, a 8×8 two-dimensional CA, or a 4×4×4 three-dimensional CA, One of ordinary skill in the art will recognize that the number of cells is not limited to 64. In addition, the number of dimensions may be more than three.

Figure 2A:
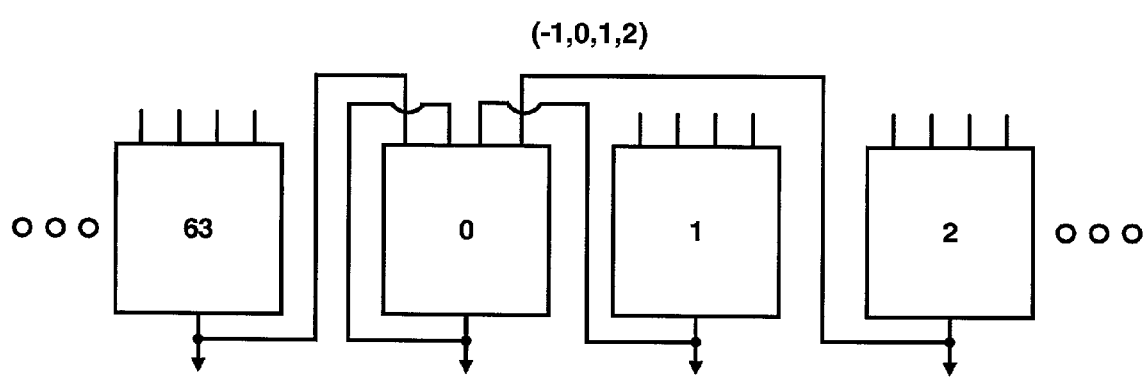
FIGS. 2A–2C illustrate exemplary effects of periodic boundary conditions on connections for one, two, and three dimensional CA networks, respectively.

FIG. 2A illustrates a 64-cell one-dimensional ring automata network with a displacement of (−1, 0, 1, 2) from the perspective of cell 0. In this instance, each cell i is assumed to have the same displacement value. In a one-dimensional ring CA network, each cell i has two adjacent neighbors, one on either side. Because the CA network is periodic, cell 63 is adjacent to the cell 0, and thus the displacement of i−1 from cell 0 lands on cell 63.

In a one-dimensional CA network, a relative displacement value (−1, 0, 1, 2) indicates that $d_8$ input of cell i is connected to the output of the cell i−1 (one cell to the left), the $d_4$ input is connected to the output of the cell i itself, the $d_2$ input to cell i+1, and the d, input to cell i+2. More specifically, from the perspective of cell 0, the inputs $d_8$, $d_4$, $d_2$, and $d_1$ are connected to the outputs of cell 63, itself, cell 1, and cell 2, respectively.

Figure 2B:
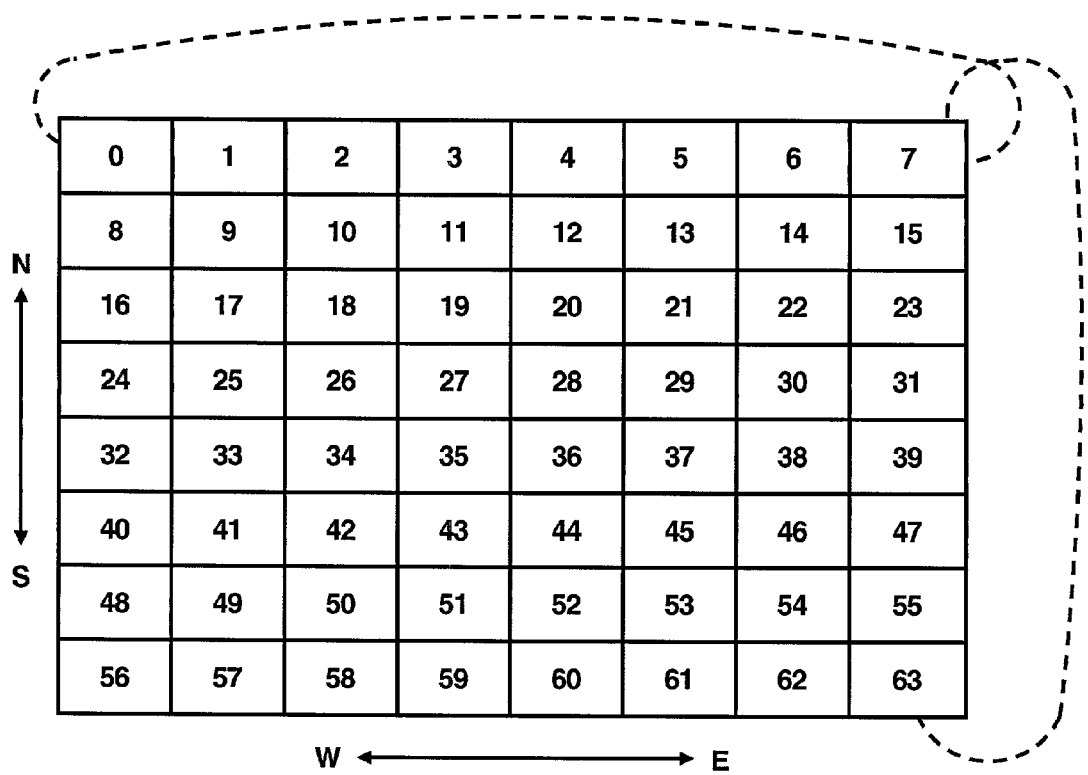

FIG. 2B illustrates a 64-cell two-dimensional automata network, also with periodic boundary conditions. In a two-dimensional toroidal CA network, each cell i has four directly adjacent neighbors, two in each of the two directions. For example, cell 7 is adjacent to cells 6 and 0 in a first direction. Cell 7 is also adjacent to cells 15 and 63 in a second direction. The adjacency to cells 0 and 63 is due to the periodic boundary condition. A periodic two-dimensional CA may be visualized as a toroid.

For the two-dimensional CA network, compass directions n, s, e, and w may be used to indicate the connection. For example, a displacement value for a cell in the 64-cell two-dimensional CA network may be (nw, c, ne, s), where c stands for center or itself. In the instance, from the perspective of cell 7, the inputs $d_8$, $d_4$, $d_2$, and $d_1$ would be connected to the outputs of cells 62, itself, cell 56, and cell 15, respectively. One of ordinary skill in the arts will recognize that the displacements are not necessarily limited to one step in any direction.

Figure 2C:
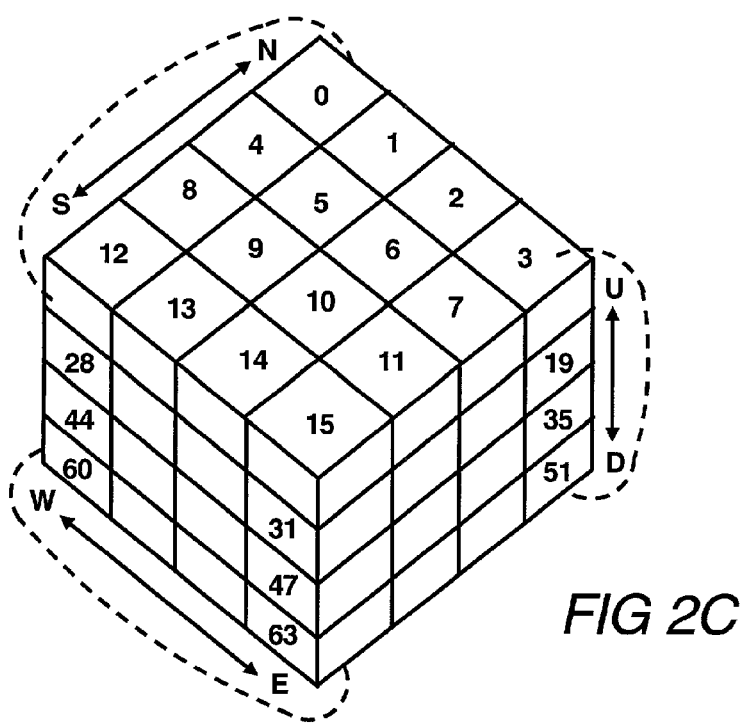

FIG. 2C illustrates a 64-cell three-dimensional automata network, again with periodic boundary conditions. In a three-dimensional periodic CA network, each cell i has six directly adjacent neighbors, two in each of the three directions. For example, cell 3 is adjacent to cells 2 and 0 in a first direction, to cells 7 and 15 in a second direction, and to cells 19 and 51 in a third direction. The adjacency to cells 0, 15, and 51 is due to the periodic boundary condition. Like the situation with the two-dimensional CA, one of ordinary skill in the arts will recognize that the displacements are not necessarily limited to one step in any direction.

In addition, while the neighborhood size N being 4 has been illustrated, one of ordinary skill in the arts will recognize that N can be of any size in theory.

II. Determining CA-Based RNG Candidates

Figure 3A:
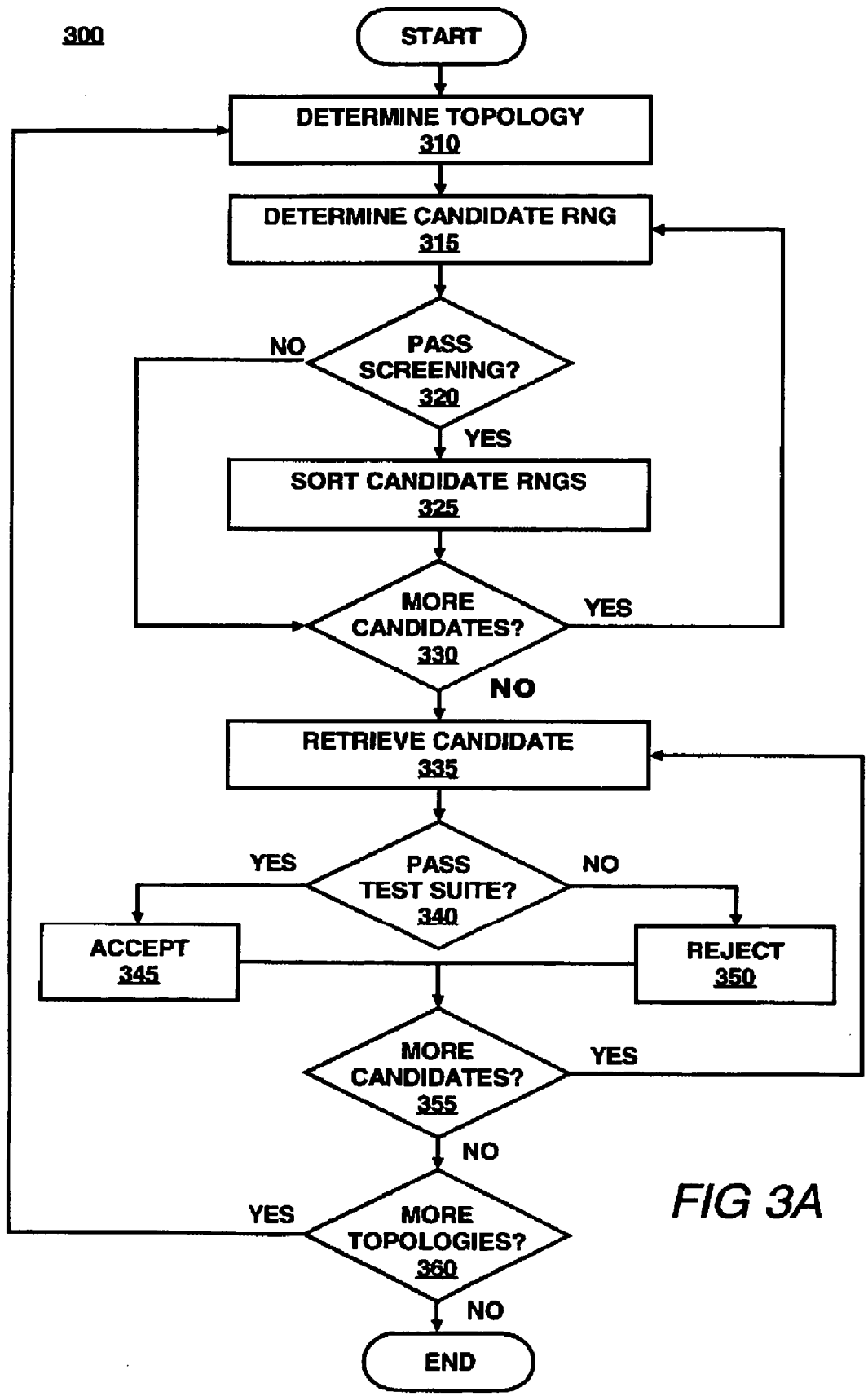
FIGS. 3A and 3B illustrate exemplary embodiments of methods of generating CA-based RNGs.

FIG. 3A illustrates an exemplary method 300 to generate a CA-based RNG. The method 300 may be categorized as carrying out three broad processes of determining an interconnection topology, screening CA-based RNG candidates based on the interconnection topology, subjecting the RNG candidates through a suite of tests for those that pass the screening process. These are repeated for different interconnection topologies.

Broadly, in step 310, the method 300 determines an interconnection topology. Then in step 315, for the topology determined in step 310, a candidate CA-based RNG is determined. In step 320, the candidate RNG is screened. If the candidate RNG does not pass the screening process, then the method 300 proceeds to step 330. If the candidate RNG does pass the screening process, then in step 325, the candidate RNG is sorted. In this step, it may be that only a limited number of candidates may be kept, for example 100 top candidate RNGs. The method 300 then proceeds to step 330. In step 330, it is determined whether or not there are more candidate RNGs for the given topology determined at step 310. If so, the method 300 returns to step 315. If not, then the method proceeds the step 335.

In step 335, a candidate RNG that passed the screening process is retrieved, then in step 340, the candidate RNG is subjected to a suite of random number generating tests, such as the DIEHARD suite. If the candidate RNG passes the suite of tests, it is accepted as a viable CA-based RNG in step 345. If not, the candidate RNG is rejected in step 350. Then in step 355, it is determined whether more candidate RNGs exist. If so, the method 300 returns to step 335. If not, then the method 300 proceeds to step 360.

In step 360, it is determined if more topologies exist. If so, then the method 300 returns to step 310. If not, the method 300 ends.

Figure 3B:
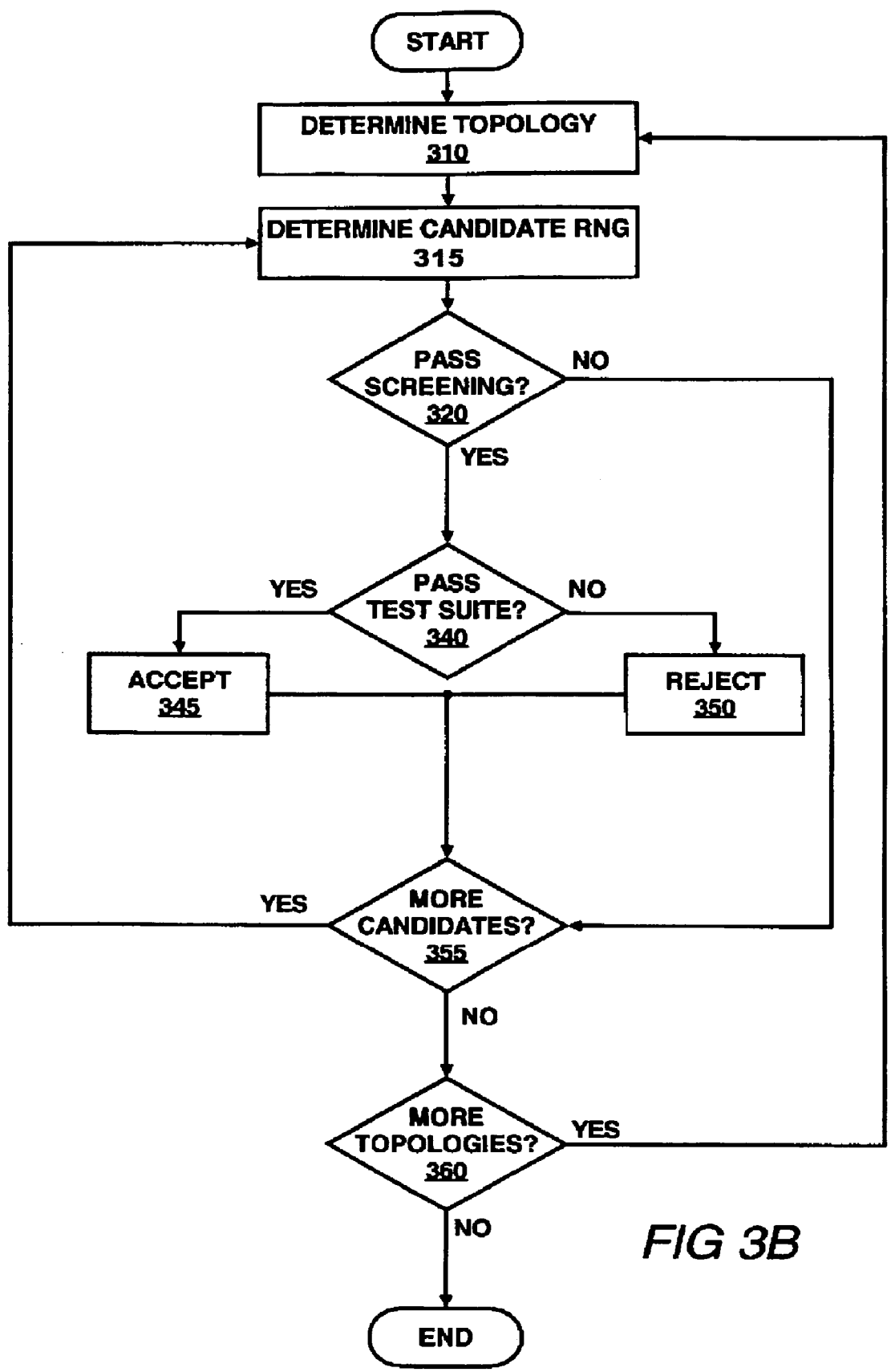

Note that the method 300 is only an exemplary method to generate CA-based RNGs. The steps outlined may be performed in different order, modified, or deleted, or other steps may be added. For example, FIG. 3B illustrates a second method 300-2 to generate CA-based RNGs. An important aspect of the methods is that either method 300 or 300-2 is capable of exhaustively considering CA-based RNG for any given topology. In addition, either method is also capable of exhaustively considering interconnection topologies for a given neighborhood size N.

In the following, some of the steps of the methods 300 and/or 300-2 are explained in detail. In step 310, the interconnection topology may be based on the number cells that make up a cellular automata. The number of cells typically corresponds with the length of the random number generated. For example, a 64-cell CA is capable of generating a 64-bit random number. The length may be 32, 128, 256, etc. One of ordinary skill will recognize that the length of the CA may be a user settable parameter, and need not be limited purely to exponentials of the number 2.

The interconnection topology may also be based on the neighborhood size N, which is the number of inputs to a cell, for example 4. Again, one of ordinary skill will recognize that the neighborhood size N may be a user settable parameter. The interconnection topology may be represented by the notations provided above. For example, using N=4, the displacement value for a cell for a CA-network may be represented by the notation $(d_8, d_{4, d2, d1})$ where $d_x$ represents relative displacement from the current cell as described above.

The CA may be under a periodic boundary conditions in all dimensions. In this instance, all cells of the CA may have the exactly same topology, i.e., have the identical displacement values. This is the simplest case since there are no special case end cells to deal with.

There may be other conditions specified on the topology. For example, one of the inputs to a cell may be required to be connected to its output. In other words, one input has a displacement value of "0" or "c" depending on the dimensions of the CA. This has practical implications. For instance, the CA-based RNG may be implemented with electrical elements such as the field programmable gate arrays (FPGAs). Typically, it is easier to fabricate FPGAs, or any other electrical elements, which have fewer connections to external elements. By specifying an element which has an input tied to its own output, the number of external connections is reduced.

Another condition that may be specified on the topology is that at least one of the inputs of the cell be connected to another cell with a displacement distance that cannot be evenly divided into the length of the CA. This ensures that a chain of connections, at least through that input, touches all cells of the CA. For example, again assume N=4 and the number of cells in the CA is 32. Also assume that one of the displacements, such as $d_8$, is 2, i.e., the displacement is given as $(2, x_1, x_2, x_3)$. In this instance, we note that the $d_8$ chain does not touch all cells. Starting from cell 0, the $d_8$ input is connected to the output of cell 2, whose $d_8$ input is connected to the output of cell 4, and so on such that eventually, the $d_8$ input of cell 30 is connected to cell 0. All odd numbered cells are skipped in this chain indicating that the even numbered cells cannot influence the output of the odd numbered cells at all, at least through the $d_8$ chain.

In this instance, by having an odd displacement value for at least one input, such as $d_4$, each cell may have the potential to influence the output of all other cells as time progresses. More generally, by including a displacement value of for an input of a cell that is not evenly divisible by the length of the CA, each cell of that CA may effect the output of all other cells of that CA.

Note that a special case exists where a displacement value is 1 (or −1). If a displacement value is 1, then that particular chain touches all cells, even though 1 can always be divided evenly into whole numbers.

The topology may be explicitly provided. Also, all possible topologies may be exhaustively calculated based on the neighborhood size N and the CA network size. To illustrate, again assume that N=4 and CA network size is 64. Assuming periodic boundary conditions in all dimensions, the number of possible topologies is 64*63*62*61= 15,249,024. This is because the first input, such as $d_8$, may be connected to an output of any of the 64 cells (including itself), the second input may be connected to any of the remaining 63 cells, and so on.

The number of topologies may be pruned by applying conditions as stated above. For example, if one of the cell's inputs is required to be connected to the cell's output, then the universe of topologies is reduced by a factor of 16. This is because the universe of topologies, using the same example, reduces to (1*63*62*61)+ (63*1*62*61)+(63*62*1*61)+(63*62*61*1)=4*63*62*61.

Another pruning condition may be to require at least one chain of connections to touch all cells. For each chain required to touch all cells, the universe is further reduced by a factor of 2 for the above example. Thus, if each of the three remaining chains are required to touch all cells, then the universe of topologies is reduced by another factor of 8. Thus from the original universe of 15,249,024 topologies, the list of possible acceptable topologies may be reduced to 119,133—a reduction factor of 128(16×8).

In step 315, CA-based RNG candidates may be determined for a particular topology provided in step 310. The exhaustive list of CA-based RNG candidates may be provided. For example, if N=4, then the list of CA-based RNG candidates provided may range from CA00000 to CA65535. In this step, a particular CA, for example the CA06990 of FIG. 1A, may be provided for the given particular topology, such as (−1, 0, 1, 2) of FIG. 2A.

In step 320, the CA-based RNG candidate may be subjected to a screening process. The screening process may include calculating the entropy of the RNG candidate. If the calculated entropy does not meet one or more predetermined criteria, then the particular candidate may be rejected and the method 300 may continue by testing for more candidate RNGs in step 330.

On the other hand, if the calculated entropy does meet the predetermined criteria, then in step 325, the particular candidate RNG may be kept and sorted. The predetermined criteria may include a predetermined threshold level of entropy. In other words, for any candidate RNG whose entropy is at or above the predetermined threshold level, that candidate RNG may be kept. The criteria may also may include simply accepting a predetermined number of RNGs with the highest entropies. One of ordinary skill will recognize that the predetermined criteria are user settable parameters.

An example entropy calculation process will be described, again using a 64-cell CA and N=4. When the neighborhood size is 4, there are $2^{16}$ (or 65,536) possible CAs for a given interconnection topology. The CAs can be exhaustively searched for high entropy candidates. A $2^N$ bit entropy (16 in this instance, entropy is defined to be $S_{16}$) is calculated according to the following formula:

$$S_{16} = -\sum_{i=0}^{2^{16}-1} p_i \log_2 p_i \quad (1)$$

where 16-bit binary value of i represents the subsequence being tested and $p_i$ is the observed probability of its occurrence. Also, $\log_2(0)$ is defined to be 0. $S_{16}$ has a maximum entropy value of 16 when all 16-bit substrings from all 0s to all 1s occur with equal probability.

For a given topology, each candidate RNG, starting from CA00000 to CA65535, is initialized by setting the state of the first cell (cell 0) to 1, setting the states of all other cells (1–63) to 0, and then by advancing the clock 80-cycles (length of the CA plus the 16 bit-serial registers used as part of the entropy calculation) which provides a first CA state. Each cell of the CA is connected to a separate 16 bit serial register. In this manner, a 16-bit history is kept for each cell.

For a given CA state, 16-bit subsequences are checked from the perspective of all 64 bits in the CA. For example, the first check is on subsequence represented by bits 0–15, the second check is on bits 1–16, the third on 2–17, and so on until the $64^{th}$ check is on bits 63–14 (due to the periodic boundary condition). In addition to the checks on the subsequences, the bit-serial registers connected to each cell of the CA are checked. Thus, a total of 128 checks are performed for a CA state.

Then the clock is advanced to the next CA state and the CA is checked again. This process occurs for $2^{13}$ clock cycles before proceeding to the next candidate RNG. Thus for a given CA, an expected count for any 16-bit subsequence is 16. The speed of the search may be increased considerably by rejecting any candidate RNG with any particular subsequence that exceeds some predetermined limit. For example, if the count of any subsequence exceeds 4 times the expected value, then that candidate RNG may be rejected. The reason is that such a candidate RNG is unlikely to have high enough entropy to pass the suite of random number tests.

This process may be repeated for all candidate RNGs. Note that the above process may be adjusted to calculate entropy for CA of any length and for any N.

In step 325, the candidate RNGs that pass the screening process of step 320 may be kept and alternatively sorted. These candidate RNGs that pass the screening process may be likely to pass the suite of tests applied in step 340. The candidate RNGs may be sorted from highest entropy to lowest.

In step 340, each candidate RNG that has passed the screening process of step 320 may be subjected to a standard suite of random number tests, such as the DIEHARD suite, as mentioned previously. The DIEHARD suite of tests by Marsaglia and may be downloaded from the Internet (G. Marsaglia, DIEHARD, http://stat.fsu.edu/~geo/diehard.html, 1998). Briefly, the DIEHARD suite comprises 17 tests, each of which may generate one or more p-values. If the input is truly random, the p-values should be uniform over the range [0,1].

If the candidate RNG passes the suite of tests, then it may be accepted as a viable RNG in step 345. If not, the candidate RNG may be rejected in step 350. One of the criteria for passing may be that the candidate RNG must pass the suite of tests without time and/or site spacing. Recall that time spacing is where the RNG is advanced more than one step between random number samples and site spacing is where not every bit value generated is used. This allows for higher performing random number generators since all bits generated at every clock cycle may be used.

III. CA-Based RNG Implementing-Module

Figure 4A:
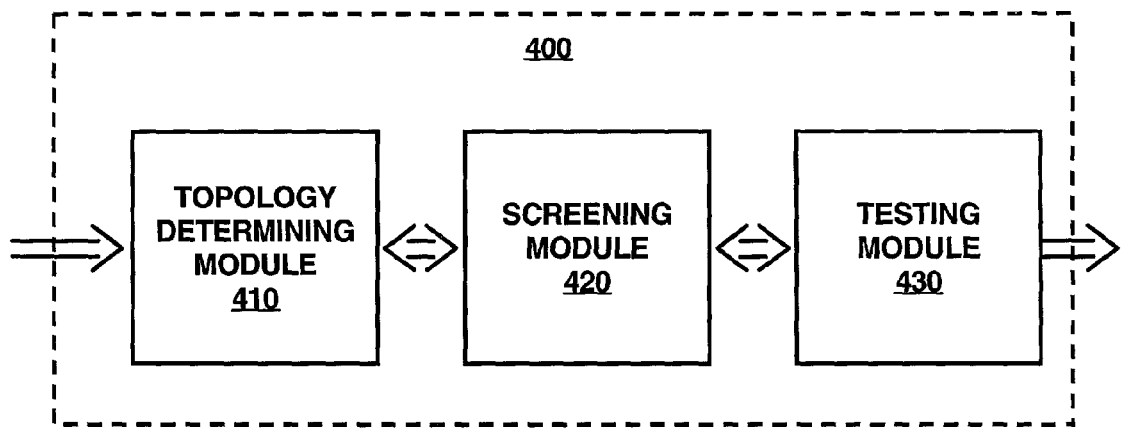
FIG. 4A illustrates an exemplary embodiment of a CA-based RNG implementing-module.

FIG. 4A illustrates an exemplary embodiment of a CA-based RNG implementing-module 400. As shown, the implementing-module 400 may include a topology-determining-module 410, a screening-module 420, and a testing-module 430. Each of these modules will be further clarified in the discussion below with exemplary implementation embodiments.

Figure 4B:
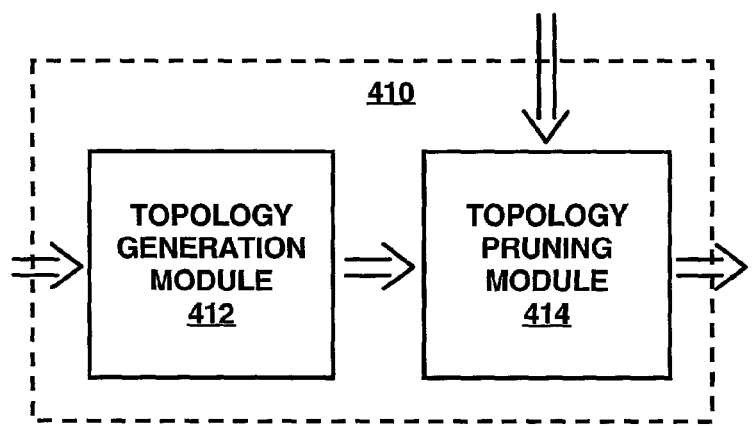
FIG. 4B illustrates an exemplary embodiment of the topology-determining-module of FIG. 4A.

FIG. 4B illustrates an exemplary embodiment of the topology-determining-module 410 of FIG. 4A. The steps performed by the topology-determining-module 410 may include steps 310 and 360 of the method 300 and 300-2 of FIGS. 3A and 3B. As shown in FIG. 4B, the topology-determining-module 410 may include a topology-generation-module 412. The topology-generation-module 412 may take inputs and generate one or more topologies based on the inputs. For instance, the inputs may dictate a specific topology. In another instance, the inputs may comprise the neighborhood size N, length of the CA, number of dimensions of the CA, boundary conditions, and the like. The topology-generation-module 412 may generate one or more interconnection topologies based on the inputs.

Also shown in FIG. 4B, the topology-determining-module 410 may include a topology-pruning-module 414. The topology-pruning-module 414 may take the topologies generated by the topology-generation-module 412 and prune the topologies based on a set on inputs. One simple example is that the inputs indicate no pruning should take place. Another example is that the topologies may be pruned by eliminating all topologies that do not have a self-connection, i.e., eliminate topologies that have no inputs connected to its output. Still another example is to keep only those topologies that include one or more input chains that touch all cells of the CA. One of ordinary skill in the arts will recognize that the topology-pruning-module 414 may operate under other pruning requirements. In addition, the topology-pruning-module 414 may enforce multiple pruning requirements, perhaps even simultaneously.

Figure 4C:
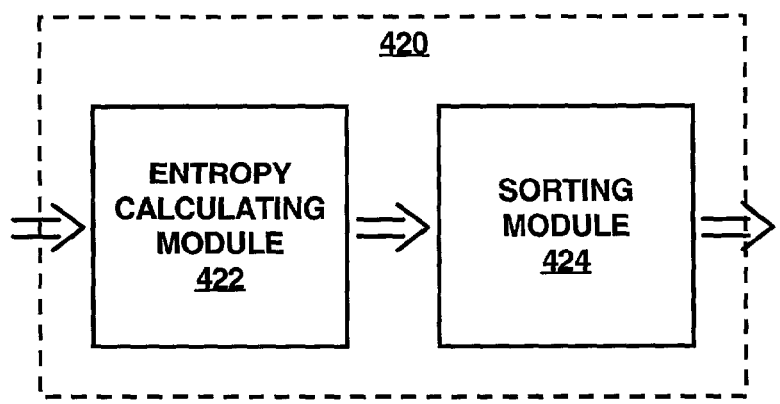
FIG. 4C illustrates an exemplary embodiment of the screening-module of FIG. 4A.

FIG. 4C illustrates an exemplary embodiment of the screening-module 420 of FIG. 4A. The steps performed by the screening-module 420 may include steps 320, 325, and 330. As shown in FIG. 4C, the screening-module 420 may include an entropy-calculating-module 422, which calculate entropies of the candidate RNGs.

Figure 4D:
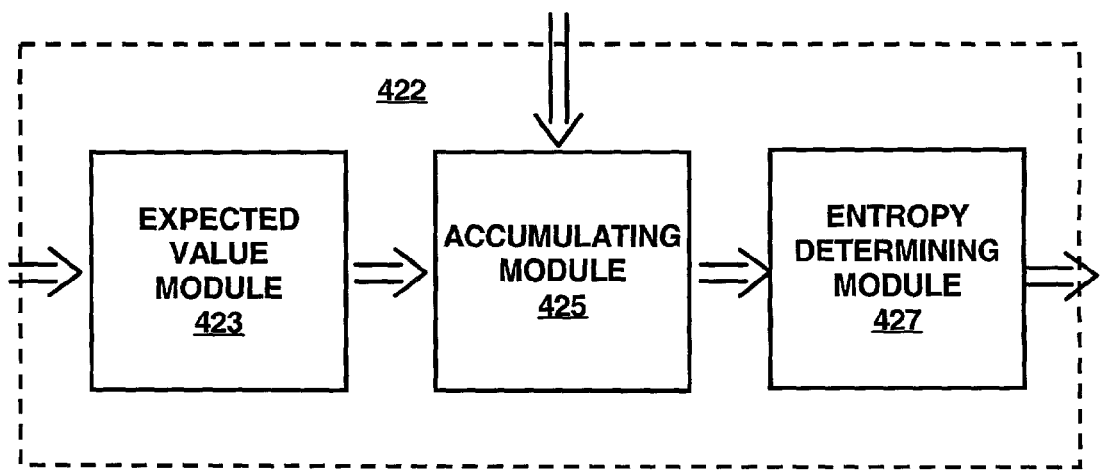
FIG. 4D illustrates an exemplary embodiment of the entropy-calculating-module of FIG. 4C.

The entropy-calculating-module 422 may include an expected-value-module 423 and an accumulating-module 425 as shown in FIG. 4D. The expected-value-module 423 may calculate an expected count of subsequences of random number sequences. The accumulating-module 425 may accumulate actual counts of the subsequences. In this manner, a candidate RNG with a subsequence whose actual count exceeds a predetermined threshold may be rejected as discussed previously. The entropy-calculating-module 422 may also include an entropy-determining-module 427, which determines the entropy of the candidate RNG based on output(s) of the accumulating-module 425.

Referring back to FIG. 4C, the screening-module 420 may further include a sorting-module 424. The sorting-module 424 may compare entropies of multiple candidate RNGs for sorting purposes. The sorting-module 424 may also compare entropies of the candidate RNGs against a predetermined threshold level of entropy. In this manner, candidate RNGs that are unlikely to pass the suite of tests may be screened off at this state.

Referring back to FIG. 4A, the testing-module 430 may take the candidate RNGs from the screening-module 420 and subject each to a suite of tests, such as the DIEHARD suite, to determine if the quality of the random numbers generated is satisfactory. The steps performed by the testing-module 430 may include steps 335, 340, 345, and 355 of FIG. 3A. One of the criteria may be that the random numbers generated must pass the test suite without time and/or site spacing.

While the invention has been described with reference to the exemplary embodiments thereof, those skilled in the art will be able to make various modifications to the described embodiments of the invention without departing from the true spirit and scope of the invention. For example, while the four-input CA-based RNGs were shown and illustrated, one of ordinary skill in the art would recognize that the description provided is applicable to CA-based RNGs with different number of inputs per cell.

The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of implementing a cellular automata based random number generator (CA-based RNG), comprising:
   determining an interconnection topology;
   screening a CA-based RNG candidate based on said interconnection topology; and
   subjecting said CA-based RNG candidate to a suite of random number tests in response to said CA-based RNG passing said screening step.

2. The method of claim 1, wherein said CA-based RNG candidate is under a periodic boundary condition in at least one dimension.

3. The method of claim 1, wherein said interconnection topology is identical for all cells of said CA-based RNG candidate.

4. The method of claim 1, wherein said determining topology step includes: exhaustively providing all possible interconnection topologies for a given neighborhood number for cells of said CA-based RNG candidate.

5. The method of claim 4, wherein said determining topology step further includes: pruning said interconnection topologies to reject interconnection topologies for which no input of a cell of said CA-based RNG candidate is connected to said cell's output.

6. The method of claim 4, wherein said determining topology step further includes: pruning said interconnection topologies to reject interconnection topologies for which displacement values for all inputs for a cell are evenly divisible by a length of said CA-based RNG for any displacement values whose absolute value is greater than 1.

7. The method of claim 1, wherein said screening step includes: calculating entropy of said CA-based RNG candidate; and accepting said CA-based RNG candidate for testing based on one or more predetermined criteria.

8. The method of claim 7, wherein said calculating entropy step includes: calculating an expected value of a subsequence within a sequence; initializing said CA-based RNG candidate through a predetermined number of clock cycles and monitoring occurrences of said subsequence; and determining said entropy based on said expected value and results of monitoring said subsequence occurrences.

9. The method of claim 8, further comprising: rejecting said CA-based RNG in response said occurrence being greater than a multiple of said expected value.

10. The method of claim 7, wherein said accepting step includes accepting said CA-based RNG candidate for testing in response to said CA-based RNG candidate being in a list of a predetermined number of highest entropy CA-based RNG candidates.

11. The method of claim 10, wherein said accepting step includes accepting said CA-based RNG candidate for testing in response to said entropy of said CA-based RNG candidate being at or above a predetermined threshold entropy.

12. The method of claim 1, wherein said standardized suite of random number tests includes the DIEHARD suite of tests.

13. The method of claim 1, further comprising: selecting said CA-based RNG candidate in response to said CA-based RNG candidate passing said suite of random number tests without at least one of time spacing and site spacing.

14. A cellular automata based random number generator (CA-based RNG) implementing-module, comprising: an interconnection-topology-determining—module determining an interconnection topology; a screening-module screening a CA-based RNG candidate based on said interconnection topology; and a testing-module subjecting said CA-based RNG candidate through a suite of tests in response to said CA-based RNG passing through said screening-module.

15. The CA-based RNG implementing-module of claim 14, wherein said screening-module comprises: an entropy-calculating-module calculating entropy of said CA-based RNG candidate; and a sorting-module accepting or rejecting said CA-based RNG candidate for testing based on a predetermined criteria.

16. The CA-based RNG implementing-module of claim 15, wherein said entropy-calculating-module comprises: an expected-value-module calculating an expected count value of subsequences within a sequence; an accumulating-module accumulating actual counts of said subsequences; and an entropy-determining-module determining said entropy based on an output or outputs of said accumulating-module.

17. The CA-based RNG implementing-module of claim 15, wherein said sorting-module accepts said CA-based RNG candidate for testing in response to said CA-based RNG candidate being in a list of a predetermined number of highest entropy CA-based RNG candidates.

18. The CA-based RNG implementing-module of claim 15, wherein said sorting-module accepts said CA-based RNG candidate for testing in response to said entropy of said CA-based RNG candidate being at or above a predetermined threshold entropy.

19. The CA-based RNG implementing-module of claim 14, wherein said interconnection-topology-determining-module comprises: a topology-generation-module generating one or more interconnection topologies; and a topology-pruning-module pruning said interconnections based on one or more predetermined criteria.

20. The CA-based RNG implementing-module of claim 19, wherein said topology-generation-module exhaustively provides all possible interconnection topologies for a given neighborhood number for cells of said CA-based RNG candidate.

21. The CA-based RNG implementing-module of claim 19, topology-pruning-module prunes said interconnection topologies to reject interconnection topologies for which no input of a cell of said CA-based RNG candidate is connected to said cell's output.

22. The CA-based RNG implementing-module of claim 19, topology-pruning-module prunes said interconnection topologies to reject interconnection topologies for which displacement values for all inputs for a cell are evenly divisible by a length of said CA-based RNG for any displacement values whose absolute value is greater than 1.

23. An apparatus for implementing a cellular automata based random number generator (CA-based RNG), comprising:

means for determining an interconnection topology;

means for screening a CA-based RNG candidate based on said interconnection topology; and means for subjecting said CA-based RNG candidate to a suite of random number tests in response to said CA-based RNG passing said screening step.

* * * * *

UNITED STATES PATENT AND TRADEMARK OFFICE
CERTIFICATE OF CORRECTION

PATENT NO. : 6,985,918 B2 Page 1 of 1
APPLICATION NO. : 09/977986
DATED : January 10, 2006
INVENTOR(S) : J. Barry Shackleford et al.

It is certified that error appears in the above-identified patent and that said Letters Patent is hereby corrected as shown below:

In column 1, line 23, after "based" insert -- random --.

In column 4, line 22, delete "d," and insert -- $d_1$ --, therefor.

Signed and Sealed this

Fourth Day of August, 2009

JOHN DOLL
*Acting Director of the United States Patent and Trademark Office*